(12) United States Patent
Hall et al.

(10) Patent No.: US 11,928,876 B2
(45) Date of Patent: *Mar. 12, 2024

(54) CONTEXTUAL SENTIMENT ANALYSIS OF DIGITAL MEMES AND TRENDS SYSTEMS AND METHODS

(71) Applicant: ViralMoment Inc., San Francisco, CA (US)

(72) Inventors: Chelsie Morgan Hall, Menlo Park, CA (US); Connyre Hamalainen, Charlotte, NC (US); Gareth Morinan, London (GB); Sheyda Demooei, Los Angeles, CA (US)

(73) Assignee: VIRALMOMENT INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/180,019

(22) Filed: Mar. 7, 2023

(65) Prior Publication Data

US 2023/0282017 A1    Sep. 7, 2023

Related U.S. Application Data

(63) Continuation of application No. 17/517,426, filed on Nov. 2, 2021, now Pat. No. 11,620,841.

(Continued)

(51) Int. Cl.
*G06V 30/262* (2022.01)
*G06V 20/40* (2022.01)
(Continued)

(52) U.S. Cl.
CPC ............ *G06V 30/274* (2022.01); *G06V 20/41* (2022.01); *G06V 30/153* (2022.01); *G06V 30/19173* (2022.01); *G06V 30/10* (2022.01)

(58) Field of Classification Search
CPC .... G06V 30/10; G06V 30/153; G06V 30/274; G06V 30/19173; G06V 20/41
See application file for complete search history.

(56) References Cited

U.S. PATENT DOCUMENTS

| 10,789,288 B1 | 9/2020 | Ranzinger |
| 11,620,841 B2 | 4/2023 | Hall et al. |

(Continued)

FOREIGN PATENT DOCUMENTS

| CN | 111126194 A | 5/2020 |
| JP | 2020130528 A | 8/2020 |

(Continued)

OTHER PUBLICATIONS

Computer English Translation of Chinese Patent No. CN 111126194A, pp. 1-8 (Year: 2020).*

(Continued)

*Primary Examiner* — Daniel G Mariam
(74) *Attorney, Agent, or Firm* — Perkins Coie LLP

(57) ABSTRACT

This disclosure is directed to methods and systems that enable automatic recognition of the meaning, sentiment, and intent of an Internet meme. An Internet meme refers to a digitized image, video, or sound that is a unit of cultural information, carries symbolic meaning representing a particular phenomenon or theme, and is generally known and understood by members of a particular culture. The disclosed methods include automatic identification of a meme template and automatic detection of the sentiment and relationships between entities in the meme. The methods provide the determination of a meme's meaning as intended by its purveyors, as well as recognition of the original sentiment and attitudes conveyed by the use of entities within the meme.

20 Claims, 10 Drawing Sheets

Related U.S. Application Data

(60) Provisional application No. 63/108,473, filed on Nov. 2, 2020.

(51) Int. Cl.
*G06V 30/148* (2022.01)
*G06V 30/19* (2022.01)
*G06V 30/10* (2022.01)

(56) References Cited

U.S. PATENT DOCUMENTS

| | | |
|---|---|---|
| 2012/0102021 A1 | 4/2012 | Hill et al. |
| 2015/0286627 A1 | 10/2015 | Chang et al. |
| 2019/0155918 A1* | 5/2019 | Jaroch .................... G06N 3/084 |
| 2020/0082002 A1 | 3/2020 | Whitman et al. |

FOREIGN PATENT DOCUMENTS

| | | |
|---|---|---|
| WO | 2008144582 A1 | 11/2008 |
| WO | 2014140977 A1 | 9/2014 |

OTHER PUBLICATIONS

International Search Report and Written Opinion dated Feb. 28, 2022 in International Patent Application No. PCT/US21/57791, 10 pages.

Pranesh, R.R. et al., MemeSem: A Multi-modal Framework for Sentimental Analysis of Meme via Transfer Learning, In: 4th Lifelong Machine Learning Workshop at ICML Jul. 20, 2020, 8 pages.

Won, D. et al., "Protest Activity Detection and Perceived Violence Estimation from Social Media Images." In: MM' 17, Proceedings of the 25th ACM international conference on Multimedia, Oct. 23-27, 2017, 9 pages.

\* cited by examiner

CONTEXTUAL SENTIMENT ANALYSIS OF DIGITAL MEMES AND TRENDS SYSTEMS AND METHODS

CROSS-REFERENCE TO RELATED APPLICATIONS

This application is a continuation of U.S. patent application Ser. No. 17/517,426, filed Nov. 2, 2021, which claims the benefit of U.S. Provisional Patent Application No. 63/108,473, filed Nov. 2, 2020, both of which are incorporated by reference in their entireties herein.

TECHNICAL FIELD

The present disclosure is related to contextual sentiment analysis for digital memes and trends.

BACKGROUND

Internet-based social listening, natural language processing, sentiment analysis, and social media measurement have been gaining in importance. Entities are deeply interested in understanding an audience's feelings, attitudes and beliefs towards a person, place or thing, based on the online text and language that people use associated with that entity. However, much Internet-based communication is increasingly occurring via videos, sounds, and images, especially memes (where a meme can be an image, audio, or a video trend that is replicated and shared). Traditional natural language processing methods are unable to contextualize automatically or at scale the emotions, relationships and sentiments that audio, video and image-based Internet memes convey, including the attitudes and beliefs that users are conveying through their usage of meme communication.

DETAILED DESCRIPTION

Figure 1:
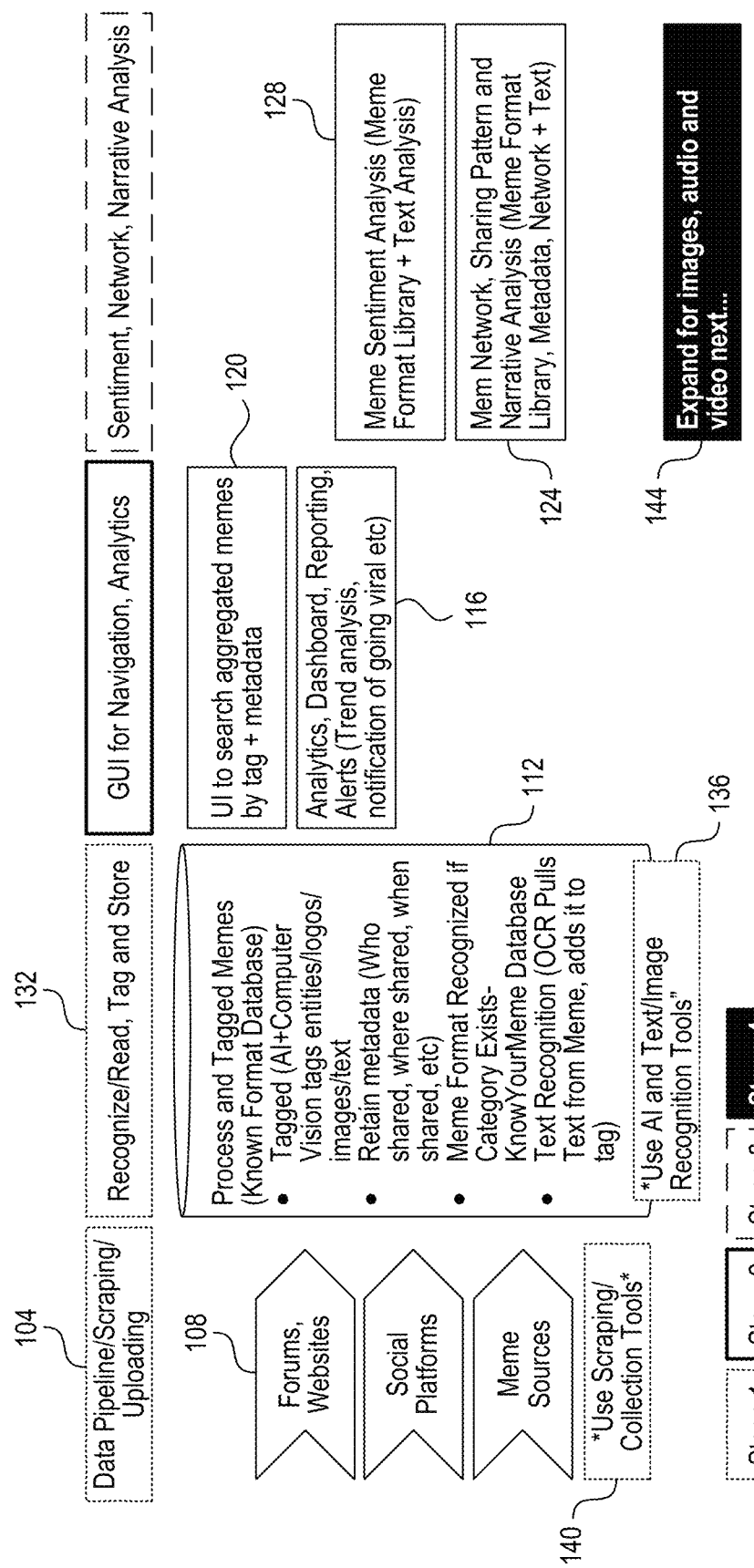
FIG. 1 is a functionality diagram illustrating contextual sentiment analysis of digital memes, in accordance with one or more embodiments.

Internet-based social listening, natural language processing, sentiment analysis, and social media measurement is gaining in importance. For instance, entities that own trademarks or brands are deeply interested in determining an audience's feelings, attitudes, or beliefs towards a person, place or thing, based on the online text and language that people use associated with that entity. Much of Internet-based communication is increasingly occurring via digital videos, sounds and images, especially digital memes. A digital meme or meme refers generally to an idea, behavior, sentiment, or style that is spread via the Internet, often through social media platforms. A digital meme includes one or more of images, audio clips, video clips, text, sounds, graphics interchange format (GIF), viral sensations, online challenges, any other expressive digital content, or a combination thereof. This disclosure is generally directed to methods, systems, and apparatus for deriving the meaning of significant, nuanced, templatized media (such as images having text, audio clips, video, or a combination thereof—hereafter referred to as "memes") by processing their content and context in conjunction to conclude the communication's intent and/or sentiment.

The embodiments disclosed herein describe a computer system, such as a server, laptop, or other computer, obtaining a meme from a data source. The data source can include an online forum, a website, a social platform, a server to which a data set has been uploaded or a combination thereof. The meme includes at least an image, a video clip, or an audio clip. The meme encapsulates at least one sentiment projected by at least one subject of the meme towards at least one object present within the meme. For example, a sentiment (e.g., desire) can be associated with "millennials" (e.g., a subject) desiring "Whiteclaw" (e.g., an object). In some embodiments, the computer system extracts features from the meme using machine vision, audio processing, optical character recognition, or a combination thereof. The features describes multiple entities including the subject(s) and the object(s).

In some embodiments, the sentiment is a general sentiment conveyed by the meme. In other embodiments, the sentiment relates to a more specific relationship between a subject and an object associated with the meme. The computer system identifies or determines at least one relationship between the subject(s) and the object(s) to provide the sentiment(s). For example, the computer system can use a machine learning (ML) model based on the features to identify the relationship(s). The ML model is previously trained to perform sentiment analysis based on a database of meme templates. A meme template refers to a format or pattern of the meme that specifies the presence of subjects(s) and object(s), the relationship(s) connecting the subjects(s) and object(s), the presence of text or other digital media, or a combination thereof. For example, the template can be used to generate memes matching the template by changing or switching out the subjects(s) and/or object(s). In some embodiments, the computer system aggregates the object(s) and/or the sentiment(s) into an aggregate progression generated from multiple obtained memes. For example, the aggregate progression can be a trend, a cluster, a collective, or a combination thereof. The aggregate progression can indicate whether the meme or the template is trending or going viral on the Internet. In some embodiments, the computer system transmits a graphical representation of the aggregate progression to a content provider (e.g., associated with the object(s)). For example, the content provider can be a manufacturer, a university, the government, a movie studio, a social network, etc. The content provider can further use the aggregate progression to enable generation of new memes using the template.

The advantages and benefits of the methods, systems, and apparatus disclosed herein include enabling high-speed computing for automatically or autonomously analyzing and identifying meme templates and the entities therein, and determining the sentiment(s) projected towards different entities. The feature extraction methods disclosed process digital images and media for machine interpretation, thus reducing the processing latency. The image processing methods described increase the accuracy of the system and provide higher computation speeds. The machine learning methods disclosed broaden the range of applications for sentiment analysis, provide a continuous scope of improvement for the system, improve efficiencies in handling of data, and aid in data acquisition. The machine learning engine disclosed further provides sentiment analysis capabilities beyond text content, such as, but not limited to, memes in the form of images, videos, audio, meme format images, and actions and gestures. The disclosed methods enable a computer system to analyze video and audio meme templates at scale (e.g., millions of different video clips, audio clips, etc.) to determine a cultural moment, its actors, public sentiment, and the narrative around the moment/meme far beyond the capability of the human mind.

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples.

Throughout this specification, plural instances (e.g., "602") may implement components, operations, or structures (e.g., "602a") described as a single instance. Further, plural instances (e.g., "602") refer collectively to a set of components, operations, or structures (e.g., "602a") described as a single instance. The description of a single component (e.g., "602a") applies equally to a like-numbered component (e.g., "602b") unless indicated otherwise. These and other aspects, features, and implementations can be expressed as methods, apparatus, systems, components, program products, means or steps for performing a function, and in other ways. These and other aspects, features, and implementations will become apparent from the following descriptions, including the claims.

FIG. 1 is a functionality diagram illustrating contextual sentiment analysis of digital memes, in accordance with one or more embodiments. FIG. 1 shows functions performed by the embodiments disclosed herein that can be implemented using software modules (e.g., module 104) or components of the example computer system 1000 illustrated and described in more detail with reference to FIG. 10. Likewise, embodiments of the system shown by FIG. 1 can include different and/or additional components or can be connected in different ways.

Figure 2A:
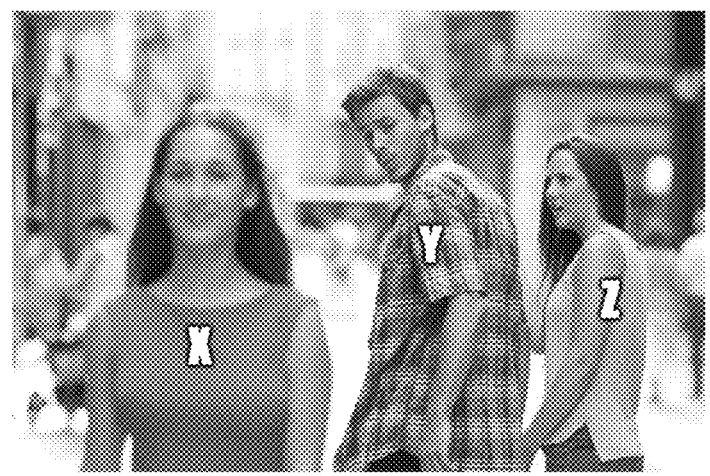
FIGS. 2A, 2B, and 2C illustrate example image meme contexts, in accordance with one or more embodiments.
Figure 3A:
FIGS. 3A, 3B, and 3C illustrate example image meme contexts, in accordance with one or more embodiments.

In Stage 1 of the process, a computer system uses module 104 to obtain a meme from a data source 108. The module 104 can perform web scraping, media search, or retrieve user uploads to the data source 108. In some embodiments, module 104 uses a data pipeline to obtain memes. The data source 108 can include a website, a social media platform (e.g., Twitter, Facebook, etc.), a subreddit (i.e., a specific online community and the posts associated with it on the social media website Reddit), another meme source, a server to which datasets have been uploaded, or a combination thereof. The meme includes one or more of images, audio clips, video clips, text, sounds, graphics interchange format (GIF), viral sensations, online challenges, any other expressive digital content, or a combination thereof. The meme encapsulates at least one sentiment (e.g., awe, indifference, jealousy) projected by at least one subject towards at least one object present within the meme. An object can be a person, place, or thing as shown by FIGS. 2A and 3A. A subject can be a person, place, thing, or even the person sharing the meme. Example sentiments are illustrated and described in more detail with reference to FIG. 7.

In some embodiments, obtaining the meme from the data source 108 includes web crawling, data scraping the data source 108, using a meme collection tool application programming interface (API) connected to the data source 108, using another media retrieval method, using an RSS feed, or a combination thereof. For example, scraping and collection tools can be used, such as web harvesting or web data extraction tools that access the World Wide Web using a web browser, a bot, or a web crawler for later retrieval and analysis. Data scraping refers to extraction of data from human-readable output coming from another program, a website, the web, a social media platform, etc. An API is a program that enables an application (e.g., the embodiments disclosed herein) to retrieve or exchange data (e.g., memes) and functionality from another program or a data source, e.g., the data source 108. An RSS feed refers to a web feed that allows users and applications (e.g., module 104) to access updates to websites (e.g., the data source 108) in a standardized, computer-readable format. A bot refers to an autonomous program on the Internet or another network that can interact with systems or users. A web crawler refers to a computer program that automatically and systematically searches web pages for certain keywords, e.g., text in memes.

In some embodiments, the computer system uses module 132 to extract a features from the meme using at least one of machine vision, audio processing, or optical character recognition. Module 132 is used in Stage 1 of the process. In other embodiments that use deep learning (illustrated and described in more detail with reference to FIG. 9), no explicit feature extraction is performed. The computer system can extract information about the content of an image in the meme, such as whether a certain region or area of the image has certain properties. For example, the properties analyzed can include spatial resolution, contrast resolution, noise, and the presence of objects, edges, etc. Example features 912 are illustrated and described in more detail with reference to FIG. 9. Example templatized areas 216, 220, 224 are illustrated in FIG. 2C.

A feature can be a specific structure in an image or video, such as a points, an edge, or an object. For example, features can be related to motion in a video clip or to shapes defined in terms of curves or boundaries between different image regions. The computer system can use audio processing to remove noise from an audio clip in the meme and balance the time-frequency ranges. Audio features can include time-domain features, acoustic properties (e.g., beat, rhythm, timbre, pitch, harmony, melody, etc.), features in the frequency domain, hand-picked features for ML modeling, or a combination thereof. The computer system can further extract features using electronic conversion of images of typed, handwritten, or printed text in the meme into machine-encoded text. The text can be captured from a document, a photo of a document, a scene-photo, or from subtitle text superimposed in the meme.

The features describe multiple entities including the subject(s) and the object(s) associated with the meme, as illustrated and described in more detail with reference to FIGS. 2A-2C. Using module 136 in Stage 1 of the process, the computer system determines at least one relationship between the subject(s) and the object(s) to provide the sentiment(s) (e.g., awe, indifference, jealousy, etc.) using an ML model. An example ML model 916 is illustrated and described in more detail with reference to FIG. 9. Example relationships between a subject and objects of a meme are illustrated and described in more detail with reference to FIGS. 2A-2C. In some embodiments, the computer system determines the relationship(s) based on the features. In other embodiments (described in more detail with reference to FIG. 9) that use deep learning, such as convolutional neural networks (CNNs), no explicit feature extraction is performed, and the computer system determines the relationship(s) using the meme directly, e.g., using the multiple layers of a CNN.

In some embodiments, using module 136 in Stage 1 of the process, the computer system determines a template of the meme using an ML model trained based on the database 112 of meme templates. The template can describe: (1) at least one relationship between the subject(s) and the object(s) associated with the meme, and (2) at least one sentiment (e.g., awe, indifference, jealousy) projected by the subject(s) towards the object(s). In some embodiments, the ML model is trained to perform sentiment analysis using module 128 in Stage 3 based on the database 112 of meme templates, for example, using the ML training methods described in more detail with reference to FIG. 9. Example meme templates are illustrated and described in more detail with reference to FIGS. 2A and 3A. In Stage 3, the module 128 is used for the ML training as well as to generate the database 112 of meme templates. Generating the database 112 and performing the sentiment analysis includes processing and tagging memes in accordance with a Known Format Database (database 112). For example, artificial intelligence (AI) and computer vision can be used to tag entities, logos, images, text, or a combination thereof at the feature extraction stage using module 132 in Stage 1. In embodiments, text recognition (OCR) is used to extract text from the meme and add the text to a tag. The module 128 can also store metadata describing who shared a particular meme, on which platform it was shared, when it was shared, etc. to generate the database 112. Using module 136 in Stage 1, the ML model recognizes a meme format when it identifies a category matching the template in the database 112.

In some embodiments, the computer system aggregates the object(s) and the identified sentiment(s) into an aggregate progression generated from multiple obtained memes. The multiple memes are obtained using module 140. The module 140 performs web scraping or retrieves user uploads (the multiple memes) to the data source 108. In some embodiments, module 140 uses a data pipeline to obtain the multiple memes. For example, scraping and collection tools can be used, such as web harvesting or web data extraction tools that access the World Wide Web using a web browser, a bot, or a web crawler for later retrieval and analysis.

In Stage 2 of the process, module 120 is used for generating the aggregate progression. The aggregate progression indicates the frequency of a meme being shared and/or transmitted across a social media platform, a subreddit, the Internet, or a combination thereof over particular periods of time. The aggregate progression can be used to determine whether a particular meme or a particular meme format is viral and the time period it is/was viral during using module 120. In some embodiments, the aggregate progression tracks the virality and tendency for the meme or its format to circulate, the "likes," the retweets, the shares, or a combination thereof. The computer system can track the meme's longevity, fecundity (the rate at which the meme is copied and spread), the number of copies made in a certain unit of time, a number of alterations, a number of social networks used, a number of variations, or a combination thereof.

In some embodiments, a graphical user interface (GUI) enables users to query for relevant memes utilizing meme tags (e.g., "memes related to Covid-19," "memes related to sleeping," or "memes related to disappointment"). The module 120 further provides functionality that includes, but is not limited to, analysis of trends and associations, and tabulation of virality of memes (e.g., in November 2021, traffic of "White House memes" increased by 80%). The computer system can identify common associations between meme tags (e.g., "Bud Light" is often associated with parties). As memes are added to the database 112, analytics can be applied to relay insights including, but not limited to, trends regarding how a social network, society, or culture feels about an entity, what entities are popular, when they become popular, whether sentiments (e.g., awe, indifference, jealousy) projected towards an entity are positive or negative, or if there is a nuanced emotion around a given cultural entity.

In some embodiments, using module 136, the computer system determines, from the aggregate progression, multiple sentiments (e.g., awe, indifference, jealousy) encapsulated by the multiple memes and projected towards the identified object(s) in the memes. For example, the aggregate progression can be a trend, a cluster, a collective, or a combination thereof. For example, an object can be an online streaming show. The aggregate progression reveals that users viewing the show have shared memes encapsulating the sentiments of cheer, comfort, delight, elation, glee, and satisfaction towards the online streaming show. A content provider that owns the rights to the online streaming show can then invest in broadcasting reruns of the show based on the sentiments. The computer system can also generate and display a graphical representation of the multiple sentiments, for example, using module 116 and elements of the referential sentiment wheel of FIG. 7 on the video display 1018 of FIG. 10.

In some embodiments, the computer system transmits a graphical representation of the aggregate progression to a content provider associated with the object(s) and/or the subject(s). The computer system uses module 116 to generate the graphical representation of the aggregate progression in Stage 2. For example, the content provider can be a manufacturer, a university, the government, a movie studio, a social network, etc. The graphical representation can be a bar chart, a pie chart, a line graph, a histogram, a scatter plot, any other graphical illustration, or a combination thereof generated using module 116. The content provider can further use the aggregate progression for computer-implemented tracking of user interactions, meme traffic per network link, public sentiment towards the object(s) and/or the subject(s), or a combination thereof based on the virality of the meme and its template. In some embodiments, the computer system generates a graphical representation of the object(s) and the sentiment(s) on a display device. For example, the video display 1018 of FIG. 10 can be used. The graphical representation can show the object(s) and the sentiment(s), for example, using the referential sentiment wheel of FIG. 7. For example, the graphical representation can display each object with a pointer to the particular sentiment on the referential sentiment wheel.

In some embodiments, the computer system determines that the aggregate progression is associated with greater than a threshold frequency of the multiple obtained memes. For example, the threshold frequency can be 50% of the multiple obtained memes, 80% of the multiple obtained memes, etc. In embodiments, the threshold frequency can indicate a proportion of the multiple obtained memes. The computer system uses module 120 in Stage 2 of the process to make the determination. The threshold frequency can be modified by the computer system, a user of the embodiments disclosed herein, a content provider, or a combination thereof. The threshold frequency is used to determine whether a meme has gone viral. For example, the threshold frequency can correspond to a number of "likes," a number of retweets, a number of shares, or a combination thereof. When the aggregate progression is associated with greater than the threshold frequency of the multiple obtained memes (e.g., 80% of the obtained memes project desire for Bud Light), the computer system determines that the meme has gone viral, the meme has reached a desired level of activity among an intended audience, the meme is achieving a certain user interactions performance (e.g., traffic in "White House" memes has increased by 60%), or a combination thereof. If the aggregate progression is associated with less than the threshold frequency of the multiple obtained memes, the computer system determines that the meme has not gone viral, the meme is not trending, the meme is on a downward trend, etc.

In response to determining that the aggregate progression is associated with greater than the threshold frequency, the computer system can use module 116 to transmit a message to the content provider to generate additional memes encapsulating the sentiment(s) (e.g., awe, indifference, jealousy) and the relationship(s). For example, if a meme or a meme format encapsulating positive sentiments towards a particular online streaming show is trending, the computer system can notify the creators of the particular online streaming show to insert the particular online streaming show into additional memes of the same format or to place the meme in additional locations (e.g., websites, social platforms, etc.). In some embodiments, the computer system determines that the aggregate progression is associated with less than a threshold frequency of the multiple obtained memes. In response to determining that the aggregate progression is associated with less than the threshold frequency, the computer system transmits a message to the content provider to avoid generating additional memes encapsulating the sentiment(s) and the object(s). Thus, memes that are on a downward trend are avoided or not associated with products corresponding to the object(s).

In some embodiments, module 116 is used to generate alerts and notifications upon certain movements within the aggregate progression, such as the occurrence of a designated tag at, above, or below a particular frequency, the co-occurrence of associated tags with an entity, the co-occurrence of a sentiment at a certain threshold frequency, the sharing of a meme format at a certain threshold frequency, or a combination thereof. For example, the trending of a meme that projects positive sentiments towards images of a physical knob on a user interface of a first automobile combined with a downward trend in memes projecting positive sentiments towards images of a touchscreen user interface of a second automobile can direct automobile manufacturers to manufacture and install physical knobs on user interfaces. The meme analysis methods and the embodiments disclosed herein therefore can be used to implement user surveys and consumer satisfaction rating engines.

In Stage 3 of the process, the computer system uses module 124 to identify meme morphing. Meme morphing is a phenomenon when a first meme morphs into a second meme that shares portions of the template with the first meme. Meme morphing can indicate intense positive sentiments towards the object(s) of the first meme, such that users have invested creative efforts into updating and sharing the second meme. For example, after analyzing a first meme, the computer system obtains a second meme from the data source 108. The second meme is different from the first meme, e.g., having a different subject, a different object, different text, a different image, etc. The computer system determines that the second meme is associated with the same sentiment(s) and the relationship(s) as the first meme using the ML model. In response to determining that the second meme is associated with the same sentiment(s) and the relationship(s) as the first meme, the computer system uses module 124 and machine learning to determine that the first meme has morphed into the second meme.

In Stage 4 of the process, the computer system uses module 144 to generate new memes based on the analyzed meme ("the first meme"). For example, the computer system receives information describing at least one entity from a user. The entity can be a person, a product, an online streaming show, etc. The user can be a content provider, a company, the government, a university, etc. The computer system uses module 144 to generate a second meme comprising at least an image from the first meme, a video clip from the first meme, an audio clip from the first meme, text from the first meme, or a combination thereof. The second meme is therefore related to the first meme. The second meme encapsulates the same sentiment(s) (e.g., awe, respect, etc.) projected towards the entity as the first meme. In embodiments, the second meme encapsulates the same relationship(s) as the first meme.

Figure 2B:
Figure 2C:
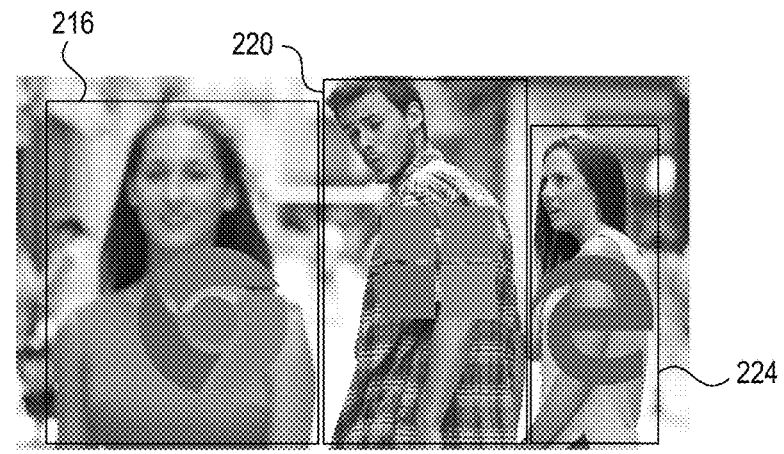

FIGS. 2A, 2B, and 2C illustrate example image meme contexts, in accordance with one or more embodiments. FIG. 2A shows a meme format (template), sometimes referred to as the "distracted boyfriend" template. The subject Y and objects X, Z associated with the meme are the multiple entities identified by the computer system when analyzing the meme using module 132 in Stage 1 of FIG. 1. In some embodiments, a subject corresponds to a first templatized area of the meme. For example, the templatized area 220 of FIG. 2C corresponds to the subject "Windows." A templatized area can include an image (e.g., image 204 of FIG. 2B), an audio clip, a video clip, text, or a combination thereof. In the template of FIG. 2A, each templatized area of the meme includes an image and text.

An object associated with the meme corresponds to a second templatized area of the meme. For example, the templatized area 216 of FIG. 2C corresponds to the subject "Chrome." In the template shown by FIG. 2A, the subject Y is located in the middle and corresponds to the image 204 (e.g., a first templatized area of the meme) shown by FIG. 2B. The first object X is located on the left hand side and corresponds to the image 212 (e.g., a second templatized area of the meme) shown by FIG. 2B. The second object Z is located on the right hand side and corresponds to the image 208 (e.g., a third templatized area of the meme) shown by FIG. 2B.

In some embodiments, determining the sentiment(s) projected by the subject Y towards the objects X, Z includes using module 136 in Stage 1 of FIG. 1 to identify a network associated with the subject Y and the objects X, Z. The network connects the multiple entities. For example, the relationships between the entities of FIG. 2A can be expressed as follows. The relationship X-Y (corresponding to an edge in the network) indicates that object X is related to subject Y, for example, (1) object X has caught the attention of subject Y and (2) object X is new or distracting to subject Y. The relationship X-Z (corresponding to another edge in the network) indicates that (1) object X has become more preferable than object Z and (2) object X is fresher and more exciting than the object Z. The relationship Y-Z (corresponding to another edge in the network) indicates that (1) subject Y is distracted from the object Z and (2) object Z is no longer most favorable to the subject Y.

Figure 10:
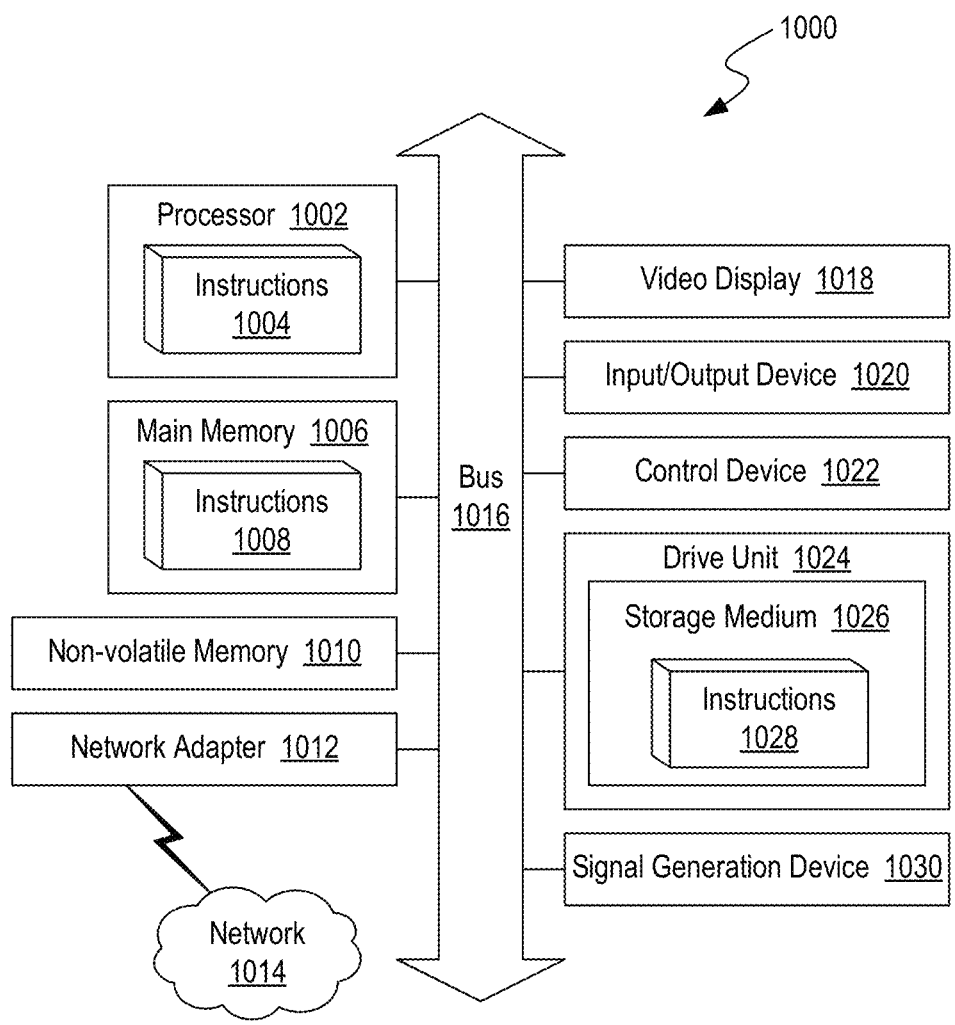
FIG. 10 is a block diagram illustrating an example computer system, in accordance with one or more embodiments.

In some embodiments, the computer system of FIG. 10 determines at least one sentiment, projected by the subject Y towards the objects X, Z based on the relationships between the entities. For example, the sentiments determined from the meme that are projected by the subject Y towards the object X can be determined as "Surprised, Happy, Valued." The sentiment determined from the meme that is projected by the subject Y towards the object Z can be "Abandoned." The sentiment that is projected by a person sharing the meme towards the subject Y can be "Neutral." In greater detail, the sentiments projected by subject Y towards the object X indicate that (1) object X is particularly favorable and (2) the object X may be not currently be in possession or is only recently in possession. The sentiments projected by subject Y towards object Z indicate that (1) the subject Y may have previously found object Z desirable but more recently the subject Y prefers something else, (2) the subject Y's tastes may have changed, and (3) the subject Y may have grown tired of what it had or the subject Y may have been presented with new options. The sentiments projected towards the object Z indicate that (1) the object Z is in possession and was once desirable and (2) the object Z may have become less interesting or failed to hold attention.

The network connecting X, Y, Z corresponds to the relationships between the subject Y and the objects X, Z. The network includes at least one edge corresponding to a relationship between the subject Y and each object. The edge(s) connect the subject Y to the objects X, Z within the network and indicate the sentiment(s). In some embodiments, identifying the meme template includes identifying the network corresponding to the relationship(s) between the multiple entities associated with the meme. For example, FIG. 2B shows that there are three entities associated with the meme: subject "Millennials," the first object "Whiteclaw," and the second object "Bud Light." The computer system determines that there is a network that contains three edges connecting the entities. A first edge connects the subject Millennials to the object Whiteclaw and corresponds to the relationship between the subject Millennials and the object Whiteclaw. A second edge connects the subject Millennials to the object Bud Light and corresponds to the relationship between the subject Millennials and the object Bud Light. A third edge connects the object Whiteclaw to the object Bud Light and corresponds to the relationship between the object Whiteclaw and the object Bud Light.

The edges between the subjects Millennials and the objects Whiteclaw and Bud Light correspond to the relationships: (1) Millennials have Bud Light but want Whiteclaw, (2) Whiteclaw is desirable to Millennials, (3) Bud Light is less exciting and less desirable to Millennials than Whiteclaw, and (4) Bud Light has lost desirability in comparison to Whiteclaw. The edges between the subjects Millennials and the objects Whiteclaw and Bud Light further indicate the following sentiments encapsulated by the meme: (1) the person sharing the meme projects a neutral sentiment towards the subject Millennials, (2) the subject Millennials projects positive sentiments (e.g., desirable, exciting, preferable) towards the object Whiteclaw, (3) the subject Millennials projects negative sentiments (e.g., undesirable, not exciting, not preferable) towards the object Bud Light, (4) the object Whiteclaw projects indifference (or, in some cases, superiority) towards the object Bud Light, and (5) the object Bud Light projects jealousy towards the object Whiteclaw.

Further, FIG. 2C shows that the determined relationships between the subject "Windows" and the objects "Chrome" and "Explorer" indicate that (1) Windows has Explorer but want Chrome, (2) Chrome is desirable to Windows, (3) Explorer is less exciting and less desirable to Windows than Chrome, and (4) Explorer has lost desirability in comparison to Chrome. The example meme of FIG. 2C thus includes images and text. The object Explore associated with the meme corresponds to the templatized area 224 of the meme.

Figure 3B:
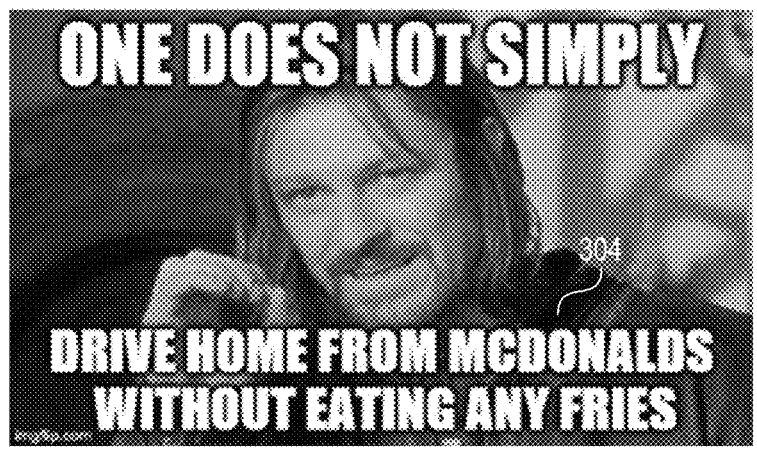
Figure 3C:

FIGS. 3A, 3B, and 3C illustrate example image meme contexts, in accordance with one or more embodiments. FIG. 3A shows a meme format (template) in which the person "N" sharing the meme is the subject of the meme. The meme template of FIG. 3A includes an image and text in two locations (templatized areas). The subject N and the object X associated with the meme are the multiple entities identified by the computer system when analyzing the meme using module 132 in Stage 1 of FIG. 1. The object X references a task that is incredibly difficult or impossible to execute. The meme is associated with a relationship between the subject N and the object X indicating that X is formidable and respected by the meme creator (subject N). The sentiments projected by the subject N towards the object X include "Astonished, Awe, Powerful, Courageous, etc."

FIG. 3B indicates that the object "driving home from McDonalds without eating any fries" is incredibly difficult to execute or is nearly impossible. The tone of the meme is humorous and sarcastic. The sentiment encapsulated by the meme and projected by the subject N towards the object "driving home from McDonalds without eating any fries" is one of awe. FIG. 3C indicates that the object "taking Christmas decorations off of a tree" is incredibly difficult to execute or is nearly impossible. The sentiment encapsulated by the meme indicates that the object "taking Christmas decorations off of a tree" is held in high regard by the subject N.

Figure 4A:
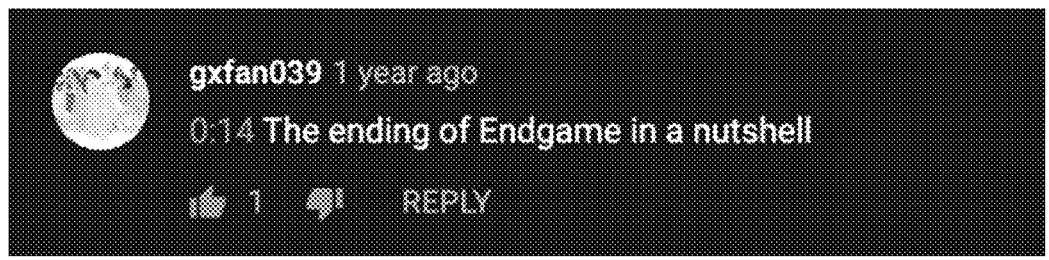
FIGS. 4A and 4B illustrate example audio meme contexts, in accordance with one or more embodiments.
Figure 4B:

FIGS. 4A and 4B illustrate example audio meme contexts, in accordance with one or more embodiments. FIG. 4A shows a meme having a template sometimes referred to as the "sad violin" template. In the template, the person sharing the meme is the subject of the meme. The example meme of FIG. 4A includes an audio clip and text. The meme includes an audio clip of a violin's sound (e.g., stored at https://www.myinstants.com/instant/sad-violinthe-meme-one/). The subject and the object ("The ending of Endgame in a nutshell") associated with the meme are the multiple entities identified by the computer system when analyzing the meme using module 132 in Stage 1 of FIG. 1. For example, optical character recognition can be used to extract the object's text from the meme. The object depicts something that is devastatingly sad. The meme is associated with a relationship between the subject and the object indicating that the subject finds "The ending of Endgame in a nutshell" very upsetting or sad (the sentiment encapsulated by the meme of FIG. 4A).

FIG. 4B shows another example of the sad violin meme. The example meme of FIG. 4B includes an audio clip, images, and text. The meme illustrated by FIG. 4B includes text 404 ("My Seat For Valentine's Day"), an image of empty chairs, and the sad violin audio clip 408. The encapsulated sentiment is that "My Seat for Valentine's Day" is regarded as very sad by the meme creator (the subject).

Figure 5A:
FIGS. 5A and 5B illustrate example video meme contexts, in accordance with one or more embodiments.
Figure 5B:
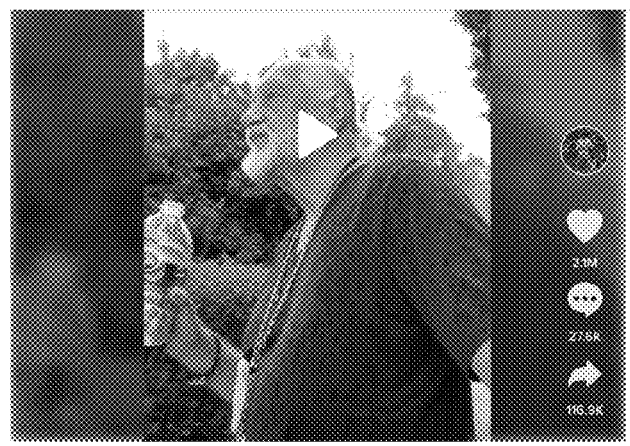

FIGS. 5A and 5B illustrate example video meme contexts, in accordance with one or more embodiments. FIG. 5A shows a meme having a template that includes a video clip. In the template, the person sharing the meme is the subject of the meme. The object associated with the meme is the person in the video in FIG. 5A. The video depicts the object skateboarding, drinking a large-sized Cranberry beverage, and listening to music by Fleetwood Mac. The subject and the object associated with the meme are the multiple entities identified by the computer system when analyzing the meme using module 132 in Stage 1 of FIG. 1. For example, machine vision, image processing, and machine learning can be used to extract and recognize the object from the meme of FIG. 5A. The video clip depicts the object as "relaxed and vibing." The meme is associated with a relationship between the subject and the object indicating that the subject finds the object "relaxed, a breath of fresh air, a calm release, bringing joy, hits different, etc." (the sentiments encapsulated by the meme of FIG. 5A).

FIG. 5B shows another example of the video meme. The meme illustrated by FIG. 5B includes a video clip of Mick Fleetwood. The encapsulated sentiments of the meme include "Mick Fleetwood is relaxed and vibing, regarded as relaxed, a breath of fresh air, a calm release, brings joy, hits different, etc." The computer system of FIG. 10, using the embodiments described herein, thus processes each meme to determine sentiment(s), meaning, and relationship(s) conveyed by the meme. The computer system segments each meme into the included entities, and identifies the sentiment(s) projected and the relationship(s) between the entities in the meme template. The computer system further identifies sentiment(s) that the meme purveyor intends to project towards each entity associated with the meme.

Figure 6:
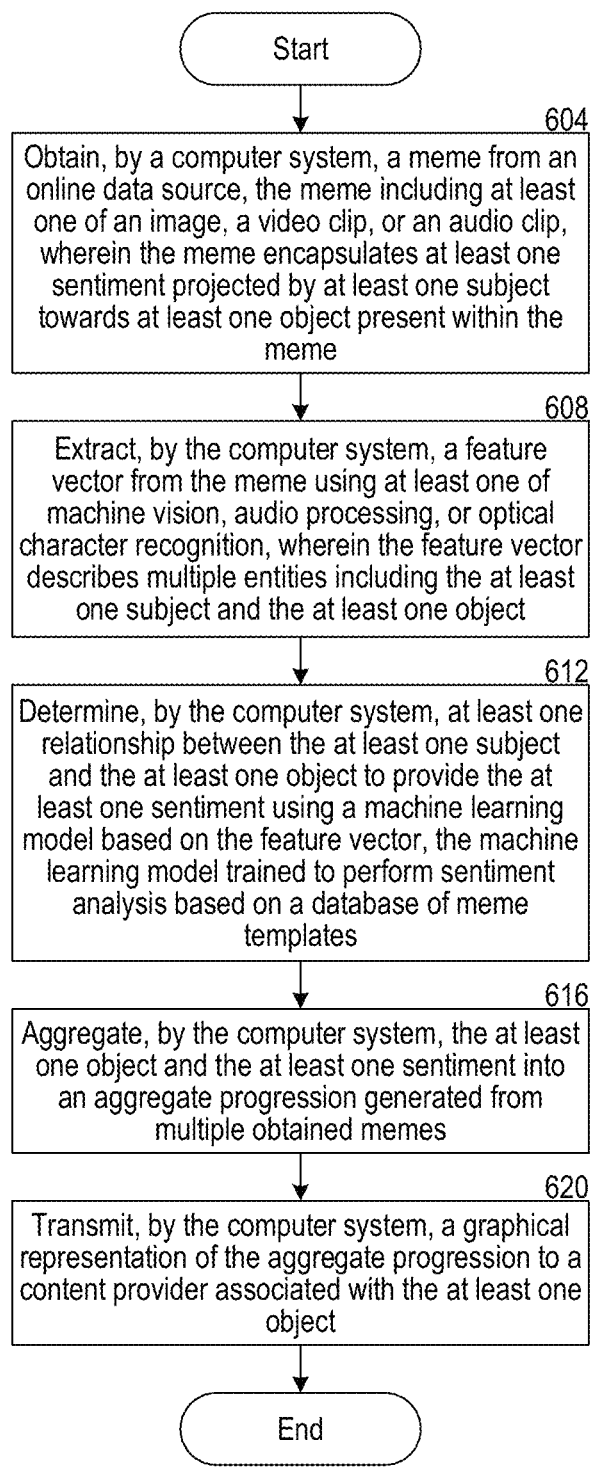
FIG. 6 is a flow diagram illustrating an example process for contextual sentiment analysis of digital memes, in accordance with one or more embodiments.

FIG. 6 is a flow diagram illustrating an example process for contextual sentiment analysis of digital memes, in accordance with one or more embodiments. In some embodiments, the process of FIG. 6 is performed by a computer system, e.g., the example computer system 1000 illustrated and described in more detail with reference to FIG. 10. In some embodiments, the computer system includes an ML system, e.g., the example ML module 900 illustrated and described in more detail with reference to FIG. 9. Particular entities, for example, the software modules illustrated and described in more detail with reference to FIG. 1 perform some or all of the steps of the process in other embodiments. Likewise, embodiments can include different and/or additional steps, or perform the steps in different orders.

In step 604, a computer system obtains a meme from a data source. The meme can be similar to the memes illustrated and described in more detail with reference to FIGS. 2B, 2C, 3B, etc. Example data sources are illustrated and described in more detail with reference to FIG. 1. The meme includes at least one of an image, a video clip, text, or an audio clip. The meme further encapsulates at least one sentiment projected by at least one subject towards at least one object present within the meme. For example, the meme can include an image of a distracted boyfriend (illustrated and described in more detail with reference to FIG. 2A) and a sentiment can reflect "desire" of the subject 204 (Millennials) for the object 212 (Whiteclaw), as illustrated and described in more detail with reference to FIG. 2B.

In step 608, the computer system extracts a features from the meme using at least one of machine vision, audio processing, or optical character recognition. An example feature vector 912 is illustrated and described in more detail with reference to FIG. 9. The feature vector describes multiple entities including the subject(s) and the object(s) of the meme. For example, in addition to the object 212 (Whiteclaw) in the meme of FIG. 2B, the meme can include a second object 208 (Bud Light), as illustrated and described in more detail with reference to FIG. 2B.

In step 612, the computer system determines at least one relationship between the subject(s) and the object(s) to provide the sentiment(s) using a ML model based on the feature vector. An example ML model 916 is illustrated and described in more detail with reference to FIG. 9. The ML model 916 is trained to perform sentiment analysis based on a database 112 of meme templates. Example meme templates are illustrated and described in more detail with reference to FIGS. 2A and 3A. The training procedure is illustrated and described in more detail with reference to FIG. 9. A meme template refers to a format or pattern of the meme that specifies the presence of subjects(s) and object(s), the relationship(s) connecting the subjects(s) and object(s), the presence of text or other digital media, or a combination thereof. For example, once the template is identified, it can be used to generate new memes matching the template by changing or switching out the subjects(s) and object(s).

In step 616, the computer system aggregates the object(s) and the sentiment(s) into an aggregate progression generated from multiple obtained memes. For example, the aggregate progression can be a trend, a cluster, a collective, or a combination thereof. The aggregate progression can indicate whether the meme or the template is trending or going viral on the Internet. For example, as shown by FIG. 1, in Stage 2 of the process, module 120 is used for generating the aggregate progression. The aggregate progression indicates the frequency of a meme being shared and/or transmitted across a social media platform, a subreddit, the Internet, or a combination thereof over particular periods of time. The aggregate progression can be used to determine whether a particular meme or a particular meme format is viral and the time period it is/was viral in during using module 120. In some embodiments, the aggregate progression tracks the virality and tendency for the meme or its format to circulate, the "likes," the retweets, the shares, any other metric, or a combination thereof. The computer system can track the meme's longevity, fecundity (the rate at which the meme is copied and spread), the number of copies made in a certain unit of time, a number of alterations, a number of social networks used, a number of variations, etc.

In step 620, the computer system transmits a graphical representation of the aggregate progression to a content provider associated with the object(s). For example, the content provider can be a manufacturer, a university, the government, a movie studio, etc. The graphical representation can be a bar chart, a pie chart, a line graph, a histogram, a scatter plot, any other graphical illustration, or a combination thereof. The content provider can further use the aggregate progression to enable generation of new memes using the template. For example, as shown by FIG. 1, the computer system uses module 116 to generate the graphical representation of the aggregate progression in Stage 2. The content provider can use the aggregate progression to enable generation of new memes using the template. The content provider can further use the aggregate progression to track user interactions, views-per-minute performance, public sentiment towards the object(s) and/or the subject(s), or a combination thereof based on the virality of the meme and its template.

Figure 7:
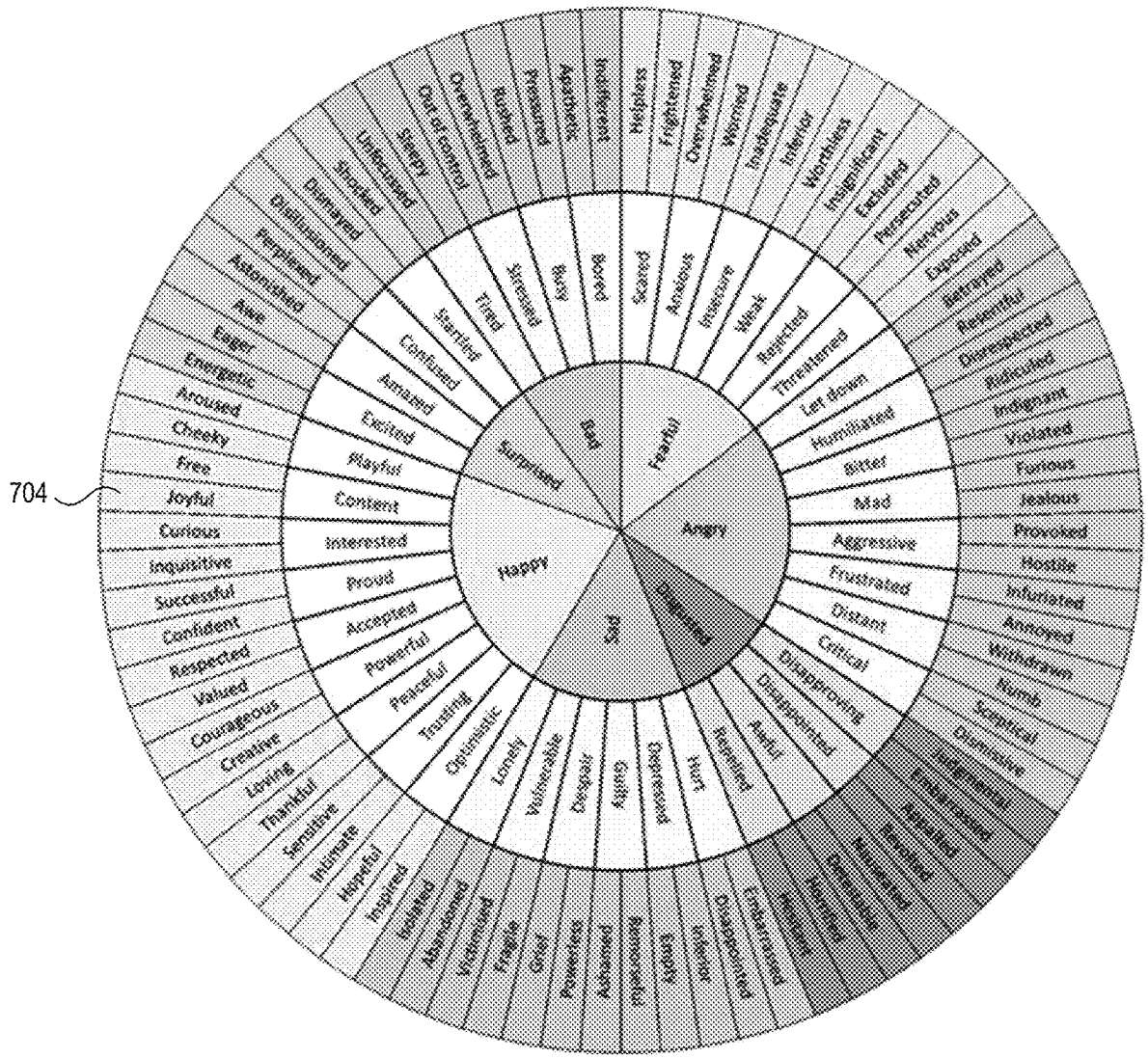
FIG. 7 is a diagram illustrating an example referential sentiment wheel for contextual sentiment analysis of digital memes, in accordance with one or more embodiments.

FIG. 7 is a diagram illustrating an example referential sentiment wheel for contextual sentiment analysis of digital memes, in accordance with one or more embodiments. The referential sentiment wheel organizes human emotions into hierarchical categories using colors, layers, and relations. For example, emotions can be arranged by colors that establish a set of similar sentiments. The layers closer to the center of the wheel depict intensified emotions, while the outer layers depict less-intense sentiments. The polar opposite emotions are arranged across from each other. Certain primary emotions can further be combined to generate complex sentiments, for example, joy+trust=love. A computer system can train the machine learning model 916 (illustrated and described in more detail with reference to FIG. 9) using the referential sentiment wheel of FIG. 7 for determining at least one sentiment 704 (e.g., joyful) projected by a subject towards an object in a meme. Elements of the referential sentiment wheel of FIG. 7 can be part of a meme template detected using an ML model. The referential sentiment wheel of FIG. 7 can be associated with the training data 920 illustrated and described in more detail with reference to FIG. 9. A manufacturer or company can further use the embodiments described herein and the referential sentiment wheel of FIG. 7 to determine the experiences and emotions a meme portrays, and generate memes to cultivate such sentiments towards a product.

Figure 8:
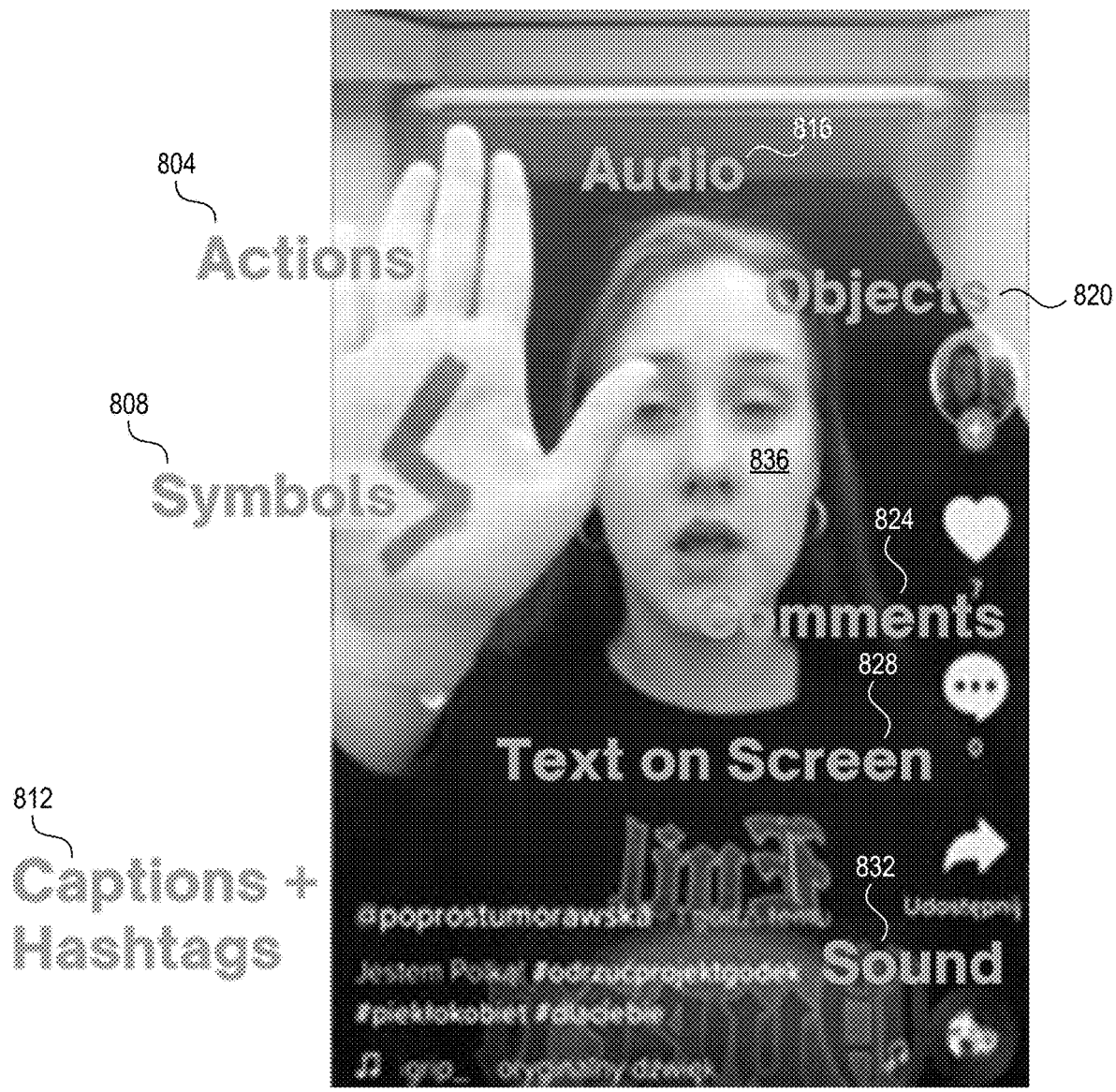
FIG. 8 is a diagram illustrating an example annotated digital meme, in accordance with one or more embodiments.

FIG. 8 is a diagram illustrating an example annotated digital meme, in accordance with one or more embodiments. The meme can be generated using the example computer system 1000 illustrated and described in more detail with reference to FIG. 10 or obtained from a data source, such as an online forum, a website, or a social media platform, as described in more detail with reference to FIG. 1. A computer system determines the template of the meme using an ML model trained based on a database of meme templates. Example meme templates are illustrated and described in more detail with reference to FIGS. 2A and 3A. Elements of the referential sentiment wheel of FIG. 7 can be part of a meme template. An example ML model 916 is illustrated and described in more detail with reference to FIG. 9. An example database 112 of meme templates is illustrated and described in more detail with reference to FIG. 1. The determined template describes at least one relationship between at least one subject 836 (the woman in the meme) and at least one object 820 associated with the meme. In FIG. 8, the object 820 is an image of a person to the right of the subject 836. The template further describes at least one sentiment projected by the subject 836 towards the at least one object 820. The sentiment(s) are based on at least one contextual element present within the meme. For example, the contextual elements can include an action 804, a facial expression, an embedded audio clip 816, comments 824, overlaid text 828, text within a video, a symbol 808, a sound 832, video metadata, an object (e.g., a car, a hat, or a house), a hashtag 812, or a combination thereof.

Figure 9:
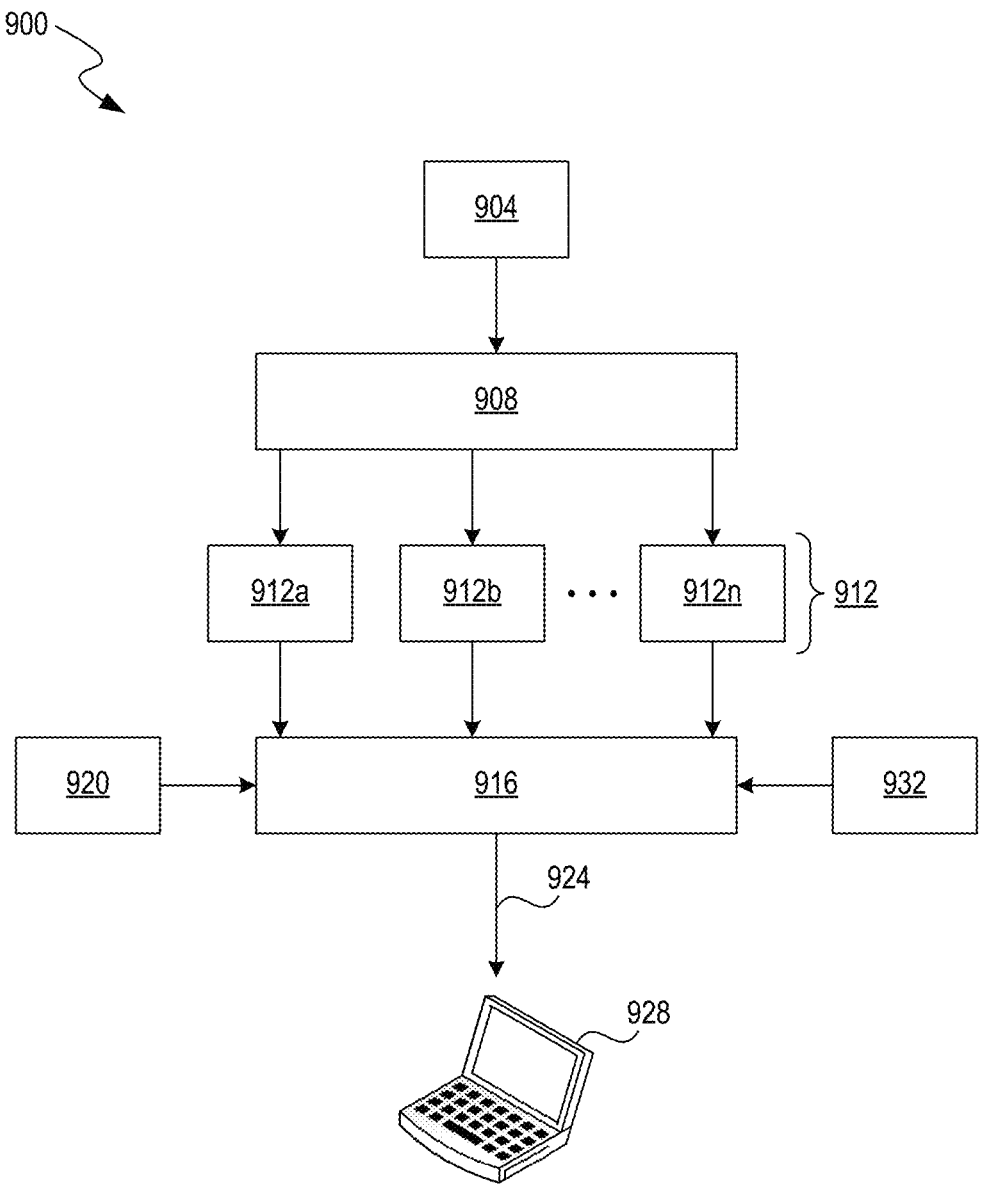
FIG. 9 is a block diagram illustrating an example machine learning (ML) system, in accordance with one or more embodiments.

FIG. 9 is a block diagram illustrating an example machine learning (ML) system 900, in accordance with one or more embodiments. The ML system 900 is implemented using components of the example computer system 1000 illustrated and described in more detail with reference to FIG. 10. Likewise, embodiments of the ML system 900 can include different and/or additional components or be connected in different ways. The ML system 900 is sometimes referred to as a ML module.

The ML system 900 includes a feature extraction module 908 implemented using components of the example computer system 1000 illustrated and described in more detail with reference to FIG. 10. In some embodiments, the feature extraction module 908 extracts a feature vector 912 from input data 904. For example, the input data 904 can include one or more images, sets of text, audio files, or video files. The feature vector 912 includes features 912a, 912b, ..., 912n. The feature extraction module 908 reduces the redundancy in the input data 904, e.g., repetitive data values, to transform the input data 904 into the reduced set of features 912, e.g., features 912a, 912b, ..., 912n. The feature vector 912 contains the relevant information from the input data 904, such that events or data value thresholds of interest can be identified by the ML model 916 by using this reduced representation. In some example embodiments, dimensionality reduction techniques, such as principal component analysis (PCA) or autoencoders are used by the feature extraction module 908.

In alternate embodiments, the ML model 916 performs deep learning (also known as deep structured learning or hierarchical learning) directly on the input data 904 to learn data representations, as opposed to using task-specific algorithms. In deep learning, no explicit feature extraction is performed; the features 912 are implicitly extracted by the ML system 900. For example, the ML model 916 can use a cascade of multiple layers of nonlinear processing units for implicit feature extraction and transformation. Each successive layer uses the output from the previous layer as input. The ML model 916 can learn in supervised (e.g., classification) and/or unsupervised (e.g., pattern analysis) modes. The ML model 916 can learn multiple levels of representations that correspond to different levels of abstraction, wherein the different levels form a hierarchy of concepts. In this manner, the ML model 916 can be configured to differentiate features of interest from background features.

In alternative example embodiments, the ML model 916, e.g., in the form of a CNN generates the output 924, without the need for feature extraction, directly from the input data 904. The output 924 is provided to the computer device 928. The computer device 928 is a server, computer, tablet, smartphone, smart speaker, etc., implemented using components of the example computer system 1000 illustrated and described in more detail with reference to FIG. 10. In some embodiments, the steps performed by the ML system 900 are stored in memory on the computer device 928 for execution. In other embodiments, the output 924 is displayed on high-definition monitors.

A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 916 can be a CNN that includes both convolutional layers and max pooling layers. The architecture of the ML model 916 can be "fully convolutional," which means that variable sized sensor data vectors can be fed into it. For all convolutional layers, the ML model 916 can specify a kernel size, a stride of the convolution, and an amount of zero padding applied to the input of that layer. For the pooling layers, the ML model 916 can specify the kernel size and stride of the pooling.

In some embodiments, the ML system 900 trains the ML model 916, based on the training data 920, to correlate the feature vector 912 to expected outputs in the training data 920. As part of the training of the ML model 916, the ML system 900 forms a training set of features and training labels by identifying a positive training set of features that have been determined to have a desired property in question and a negative training set of features that lack the property in question. The ML system 900 applies ML techniques to train the ML model 916, that when applied to the feature vector 912, outputs indications of whether the feature vector 912 has an associated desired property or properties.

The ML system 900 can use supervised ML to train the ML model 916, with features from the training sets serving as the inputs. In some embodiments, different ML techniques, such as support vector machine (SVM), regression, naïve Bayes, random forests, neural networks, etc., are used. In some example embodiments, a validation set 932 is formed of additional features, other than those in the training data 920, which have already been determined to have or to lack the property in question. The ML system 900 applies the trained ML model 916 to the features of the validation set 932 to quantify the accuracy of the ML model 916. In some embodiments, the ML system 900 iteratively re-trains the ML model 916 until the occurrence of a stopping condition, such as the accuracy measurement indication that the ML model 916 is sufficiently accurate, or a number of training rounds having taken place.

FIG. 10 is a block diagram illustrating an example computer system 1000, in accordance with one or more embodiments. In some embodiments, components of the example computer system 1000 are used to implement the ML system 900 illustrated and described in more detail with reference to FIG. 9 or the software modules (e.g., module 104) illustrated and described in more detail with reference to FIG. 1. At least some operations described herein can be implemented on the computer system 1001.

The computer system 1000 can include one or more central processing units ("processors") 1002, main memory 1006, non-volatile memory 1010, network adapters 1012 (e.g., network interface), video displays 1018, input/output devices 1020, control devices 1022 (e.g., keyboard and pointing devices), drive units 1024 including a storage medium 1026, and a signal generation device 1020 that are communicatively connected to a bus 1016. The bus 1016 is illustrated as an abstraction that represents one or more physical buses and/or point-to-point connections that are connected by appropriate bridges, adapters, or controllers. The bus 1016, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1000 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1000.

While the main memory 1006, non-volatile memory 1010, and storage medium 1026 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1028. The term "machine-readable medium" and "storage medium" shall also be taken to include any medium that is capable of storing, encoding, or carrying a set of instructions for execution by the computer system 1000. In some embodiments, the non-volatile memory 1010 or the storage medium 1026 is a non-transitory, computer-readable storage medium storing computer instructions, which can be executed by the one or more central processing units ("processors") 1002 to perform functions of the embodiments disclosed herein.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1004, 1008, 1028) set at various times in various memory and storage devices in a computer device. When read and executed by the one or more processors 1002, the instruction(s) cause the computer system 1000 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1010, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1012 enables the computer system 1000 to mediate data in a network 1014 with an entity that is external to the computer system 1000 through any communication protocol supported by the computer system 1000 and the external entity. The network adapter 1012 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1012 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

We claim:

1. A computer-implemented method comprising:
    obtaining a plurality of memes encapsulating at least one sentiment projected by at least one subject towards at least one object;
    determining that a rate at which a meme of the plurality of memes is shared is associated with greater than a threshold frequency;
    determining a template of the meme describing a sentiment encapsulated by the meme and a relationship between a subject of the meme and an object present within the meme; and
    causing generation of additional memes using the template.

2. The computer-implemented method of claim 1, wherein obtaining the plurality of memes comprises:
    data scraping a data source using a meme collection tool application programming interface (API) connected to the data source or using a Web feed,
        wherein the data source comprises at least one of a social media platform, an online forum, or an online forum.

3. The computer-implemented method of claim 1, wherein determining the template comprises:
    identifying a network connecting the subject and the object,
        wherein the network comprises an edge corresponding to the relationship.

4. The computer-implemented method of claim 1, wherein the sentiment is based on at least one contextual element present within the meme, and
    wherein the at least one contextual element comprises at least one of an action, a facial expression, overlaid text, text within a video, a symbol, a sound, video metadata, an image, or a hashtag.

5. The computer-implemented method of claim 1, wherein the subject corresponds to a first templatized area of the meme and the object corresponds to a second templatized area of the meme.

6. The computer-implemented method of claim 1, wherein the meme comprises at least one of an image, a video clip, or an audio clip.

7. The computer-implemented method of claim 1, comprising:
    determining that the meme has morphed into a second meme different from the meme,
        wherein the second meme encapsulates the sentiment and is associated with the relationship.

8. A system comprising:
    at least one processor; and
    a non-transitory, computer-readable storage medium comprising instructions recorded thereon that, when executed by the at least one processor, cause the system to:
        obtain a plurality of memes encapsulating at least one sentiment projected by at least one subject towards at least one object;
        determine that a rate at which a meme of the plurality of memes is shared is associated with greater than a threshold frequency;
        determine a template of the meme describing a sentiment encapsulated by the meme and a relationship between a subject of the meme and an object present within the meme; and
        cause generation of additional memes using the template.

9. The system of claim 8, wherein the instructions to obtain the plurality of memes cause the system to:
    data scrape a data source using a meme collection tool application programming interface (API) connected to the data source or using a Web feed,
        wherein the data source comprises at least one of a social media platform, an online forum, or an online forum.

10. The system of claim 8, wherein the instructions to determine the template cause the system to:
    identify a network connecting the subject and the object,
        wherein the network comprises an edge corresponding to the relationship.

11. The system of claim 8, wherein the sentiment is based on at least one contextual element present within the meme, and
    wherein the at least one contextual element comprises at least one of an action, a facial expression, overlaid text, text within a video, a symbol, a sound, video metadata, an image, or a hashtag.

12. The system of claim 8, wherein the subject corresponds to a first templatized area of the meme and the object corresponds to a second templatized area of the meme.

13. The system of claim 8, wherein the meme comprises at least one of an image, a video clip, or an audio clip.

14. The system of claim 8, wherein the instructions cause the system to:
   determine that the meme has morphed into a second meme different from the meme,
      wherein the second meme encapsulates the sentiment and is associated with the relationship.

15. A non-transitory, computer-readable storage medium comprising instructions recorded thereon that, when executed by at least one processor of a system, cause the system to:
   obtain a plurality of memes encapsulating at least one sentiment projected by at least one subject towards at least one object;
   determine that a rate at which a meme of the plurality of memes is shared is associated with greater than a threshold frequency;
   determine a template of the meme describing a sentiment encapsulated by the meme and a relationship between a subject of the meme and an object present within the meme; and
   cause generation of additional memes using the template.

16. The non-transitory, computer-readable storage medium of claim 15, wherein the instructions to obtain the plurality of memes cause the system to:
   data scrape a data source using a meme collection tool application programming interface (API) connected to the data source or using a Web feed,
      wherein the data source comprises at least one of a social media platform, an online forum, or an online forum.

17. The non-transitory, computer-readable storage medium of claim 15, wherein the instructions to determine the template cause the system to:
   identify a network connecting the subject and the object,
      wherein the network comprises an edge corresponding to the relationship.

18. The non-transitory, computer-readable storage medium of claim 15, wherein the sentiment is based on at least one contextual element present within the meme, and
   wherein the at least one contextual element comprises at least one of an action, a facial expression, overlaid text, text within a video, a symbol, a sound, video metadata, an image, or a hashtag.

19. The non-transitory, computer-readable storage medium of claim 15, wherein the subject corresponds to a first templatized area of the meme and the object corresponds to a second templatized area of the meme.

20. The non-transitory, computer-readable storage medium of claim 15, wherein the meme comprises at least one of an image, a video clip, or an audio clip.

* * * * *